United States Patent
Suresh et al.

(10) Patent No.: US 11,750,402 B2
(45) Date of Patent: *Sep. 5, 2023

(54) MESSAGE INDEX AWARE MULTI-HASH ACCELERATOR FOR POST QUANTUM CRYPTOGRAPHY SECURE HASH-BASED SIGNING AND VERIFICATION

(71) Applicant: Intel Corporation, Santa Clara, CA (US)

(72) Inventors: Vikram Suresh, Portland, OR (US); Sanu Mathew, Portland, OR (US); Manoj Sastry, Portland, OR (US); Santosh Ghosh, Hillsboro, OR (US); Raghavan Kumar, Hillsboro, OR (US); Rafael Misoczki, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 17/534,158

(22) Filed: Nov. 23, 2021

(65) Prior Publication Data

US 2022/0086010 A1    Mar. 17, 2022

Related U.S. Application Data

(63) Continuation of application No. 16/455,921, filed on Jun. 28, 2019, now Pat. No. 11,240,039.

(51) Int. Cl.
*H04L 9/40* (2022.01)
*H04L 9/32* (2006.01)
(Continued)

(52) U.S. Cl.
CPC .......... *H04L 9/3247* (2013.01); *G06F 9/3877* (2013.01); *H04L 9/0643* (2013.01); *H04L 9/0861* (2013.01); *H04L 9/50* (2022.05)

(58) Field of Classification Search
CPC ... H04L 9/3247; H04L 9/0643; H04L 9/0861; H04L 9/50; G06F 9/3877
See application file for complete search history.

(56) References Cited

U.S. PATENT DOCUMENTS 7,382,882 B1 *   6/2008   Immonen .......... H04W 12/0433
                                                            380/247
10,708,392 B2 *  7/2020   Zhuang ............... H03M 7/3084
(Continued)

FOREIGN PATENT DOCUMENTS

CN    112152787 A    12/2020
EP      3757977 A1    12/2020

OTHER PUBLICATIONS

Communication Extended European Search Report for EP Application No. 20161614.1, dated Sep. 17, 2020, 10 pages.
(Continued)

*Primary Examiner* — Ghodrat Jamshidi
(74) *Attorney, Agent, or Firm* — JAFFERY WATSON MENDONSA & HAMILTON LLP

(57) ABSTRACT

In one example an apparatus comprises a computer readable memory, a signature logic to generate a signature to be transmitted in association with a message, the signature logic to apply a hash-based signature scheme to the message using a private key to generate the signature comprising a public key, or a verification logic to verify a signature received in association with the message, the verification logic to apply the hash-based signature scheme to verify the signature using the public key, and an accelerator logic to apply a structured order to at least one set of inputs to the hash-based signature scheme. Other examples may be described.

15 Claims, 15 Drawing Sheets

(51) Int. Cl.
*H04L 9/06* (2006.01)
*G06F 9/38* (2018.01)
*H04L 9/08* (2006.01)
*H04L 9/00* (2022.01)

(56) References Cited

U.S. PATENT DOCUMENTS

| | | | |
|---|---|---|---|
| 11,184,157 B1* | 11/2021 | Gueron | H04L 9/14 |
| 2002/0184504 A1 | 12/2002 | Hughes | |
| 2006/0085561 A1 | 4/2006 | Manasse | |
| 2006/0184652 A1 | 8/2006 | Teodosiu | |
| 2007/0143826 A1* | 6/2007 | Sastry | H04L 63/08 |
| | | | 726/2 |
| 2007/0240222 A1* | 10/2007 | Tuvell | H04W 12/128 |
| | | | 726/24 |
| 2009/0328218 A1* | 12/2009 | Tsurukawa | H04L 9/3247 |
| | | | 711/216 |
| 2010/0082993 A1* | 4/2010 | Benameur | H04L 9/3247 |
| | | | 713/176 |
| 2011/0083015 A1 | 4/2011 | Meier | |
| 2012/0290842 A1 | 11/2012 | Artishdad | |
| 2012/0327956 A1 | 12/2012 | Vasudevan | |
| 2014/0298034 A1* | 10/2014 | Watanabe | H04L 9/3236 |
| | | | 713/176 |
| 2018/0091309 A1* | 3/2018 | Misoczki | H04L 9/3252 |
| 2018/0330053 A1* | 11/2018 | Ivancich | G16B 50/50 |
| 2019/0149338 A1 | 5/2019 | Byrne | |
| 2019/0319798 A1* | 10/2019 | Chalkias | H04L 9/3239 |

OTHER PUBLICATIONS

Johannes, et al., "XMSS—A Practical Forward Secure Signature Scheme based on Minimal Security Assumptions", IACR, International Association for Cryptologic Research, vol. 20111126:042212, Nov. 26, 2011, pp. 1-22, XP06005540.

* cited by examiner

WOTS One-Time Signature Scheme

Message is hashed and parsed into M:67 integers between [0,1,2,...15]

205 — Public Key pk: 67 components of 32-bytes each

210 — Signature s: 67 components of 32-bytes each

215 — Public Key pk: 67 components of 32-bytes each

MESSAGE INDEX AWARE MULTI-HASH ACCELERATOR FOR POST QUANTUM CRYPTOGRAPHY SECURE HASH-BASED SIGNING AND VERIFICATION

CLAIM TO PRIORITY

This application is a continuation of and claims the benefit of and priority to U.S. application Ser. No. 16/455,921, entitled MESSAGE INDEX AWARE MULTI-HASH ACCELERATOR FOR POST QUANTUM CRYPTOGRAPHY SECURE HASH-BASED SIGNING AND VERIFICATION, by Vikram Suresh, et al., filed Jun. 28, 2019, the entire contents of which are incorporated herein by reference.

BACKGROUND

Subject matter described herein relates generally to the field of computer security and more particularly to message index aware multi-hash accelerators for post-quantum cryptography secure hash-based signing and verification.
Existing public-key digital signature algorithms such as Rivest-Shamir-Adleman (RSA) and Elliptic Curve Digital Signature Algorithm (ECDSA) are anticipated not to be secure against brute-force attacks based on algorithms such as Shor's algorithm using quantum computers. As a result, there are efforts underway in the cryptography research community and in various standards bodies to define new standards for algorithms that are secure against quantum computers.

Accordingly, techniques to accelerate signature and verification schemes such as XMSS and LMS may find utility, e.g., in computer-based communication systems and methods.

BRIEF DESCRIPTION OF THE DRAWINGS

The detailed description is described with reference to the accompanying figures.

DETAILED DESCRIPTION

Figure 1A:
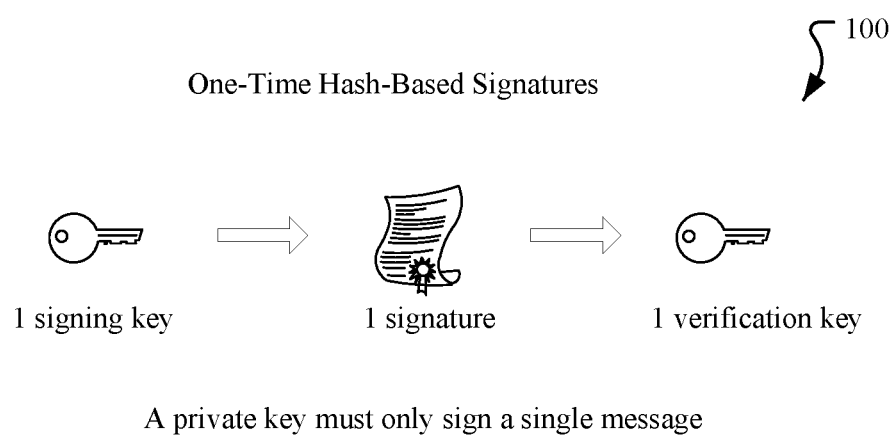
FIGS. 1A and 1B are schematic illustrations of a one-time hash-based signatures scheme and a multi-time hash-based signatures scheme, respectively.

Described herein are exemplary systems and methods to implement accelerators for post-quantum cryptography secure hash-based signing and verification. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

As described briefly above, existing public-key digital signature algorithms such as Rivest-Shamir-Adleman (RSA) and Elliptic Curve Digital Signature Algorithm (ECDSA) are anticipated not to be secure against brute-force attacks based on algorithms such as Shor's algorithm using quantum computers. As a result, there are efforts underway in the cryptography research community and in various standards bodies to define new standards for algorithms that are secure against quantum computers.

XMSS is a hash-based signature scheme using a Winternitz one-time signatures (WOTS), a one-time signature scheme, in combination with SHA2-256 as the primary underlying hash function. User of XMSS may also use SHA2-512, SHA3-SHAKE-256 or SHA3-SHAKE-512 as optional hash functions. Conventional XMSS implementations employ a generic SHA2-256 hash module to perform the XMSS specific hash functions such as Pseudo-Random Function (PRF), chain hash (F), tree hash (H) and message hash (H_msg). LMS is a hash-based signature scheme using Leighton/Micali one-time signatures (LM_OTS) as the one-time signature building block, which is based on SHA2-256 hash function.

The SHA2-256 algorithm is not designed to take advantage of portions of the XMSS/LMS module inputs that either stay constant during the WOTS/LM-OTS operation or are shared by multiple sub-operations within WOTS/LM-OTS. As a result, an XMSS-based signing operation using a conventional SHA2-256 hardware accelerator on average takes approximately 205,824 cycles to execute. Because SHA hardware is not designed to leverage common WOTS/LM-OTS input message blocks and re-compute partial hashes that might have been already computed, significant overhead in performance and energy-efficiency may be incurred.

Subject matter described herein addresses these and other issues by providing systems and methods to implement accelerators for post-quantum cryptography secure XMSS and LMS hash-based signing and verification. In some examples, common message blocks for functions in XMSS-WOTS are identified partial hash values are pre-computed for these message blocks. The pre-computed values may be shared across the different XMSS functions for each sign and/or verify operations to reduce the overall hash-operations, thereby increasing performance of XMSS and LMS operations.

Post-Quantum Cryptography Overview

Post-Quantum Cryptography (also referred to as "quantum-proof", "quantum-safe", "quantum-resistant", or simply "PQC") takes a futuristic and realistic approach to cryptography. It prepares those responsible for cryptography as well as end-users to know the cryptography is outdated; rather, it needs to evolve to be able to successfully address the evolving computing devices into quantum computing and post-quantum computing.

It is well-understood that cryptography allows for protection of data that is communicated online between individuals and entities and stored using various networks. This communication of data can range from sending and receiving of emails, purchasing of goods or services online, accessing banking or other personal information using websites, etc.

Conventional cryptography and its typical factoring and calculating of difficult mathematical scenarios may not matter when dealing with quantum computing. These mathematical problems, such as discrete logarithm, integer factorization, and elliptic-curve discrete logarithm, etc., are not capable of withstanding an attack from a powerful quantum computer. Although any post-quantum cryptography could be built on the current cryptography, the novel approach would need to be intelligent, fast, and precise enough to resist and defeat any attacks by quantum computers Today's PQC is mostly focused on the following approaches: 1) hash-based cryptography based on Merkle's hash tree public-key signature system of 1979, which is built upon a one-message-signature idea of Lamport and Diffie; 2) code-based cryptography, such as McEliece's hidden-Goppa-code public-key encryption system; 3) lattice-based cryptography based on Hoffstein-Pipher-Silverman public-key-encryption system of 1998; 4) multivariate-quadratic equations cryptography based on Patarin's HFE public-key-signature system of 1996 that is further based on the Matumoto-Imai proposal; 5) supersingular elliptical curve isogeny cryptography that relies on supersingular elliptic curves and supersingular isogeny graphs; and 6) symmetric key quantum resistance.

Figure 1B:
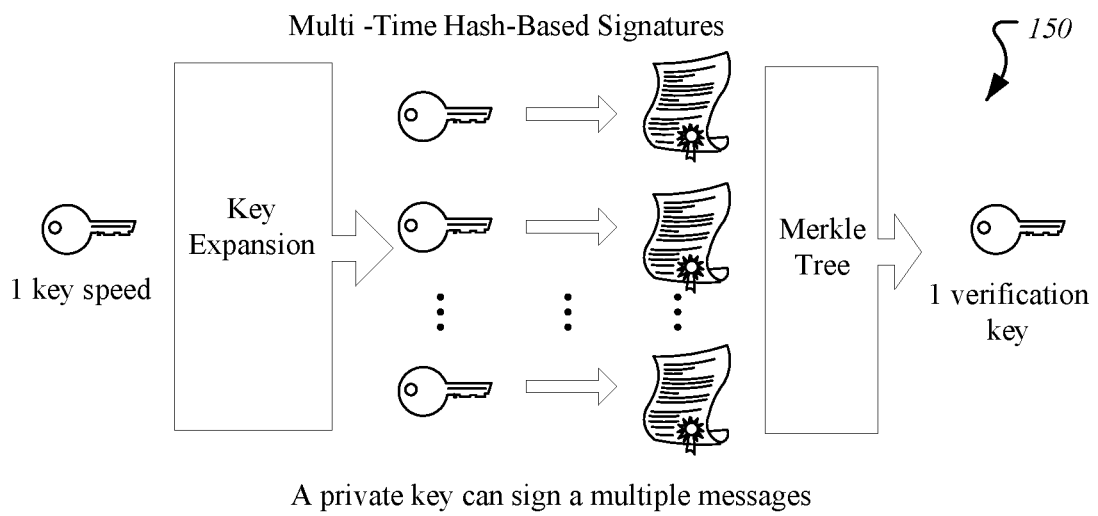

FIGS. 1A and 1B illustrate a one-time hash-based signatures scheme and a multi-time hash-based signatures scheme, respectively. As aforesaid, hash-based cryptography is based on cryptographic systems like Lamport signatures, Merkle Signatures, extended Merkle signature scheme (XMSS), and SPHINCs scheme, etc. With the advent of quantum computing and in anticipation of its growth, there have been concerns about various challenges that quantum computing could pose and what could be done to counter such challenges using the area of cryptography.

One area that is being explored to counter quantum computing challenges is hash-based signatures (HBS) since these schemes have been around for a long while and possess the necessarily basic ingredients to counter the quantum counting and post-quantum computing challenges. HBS schemes are regarded as fast signature algorithms working with fast platform secured-boot, which is regarded as the most resistant to quantum and post-quantum computing attacks.

For example, as illustrated with respect to FIG. 1A, a scheme of HBS is shown that uses Merkle trees along with a one-time signature (OTS) scheme 100, such as using a private key to sign a message and a corresponding public key to verify the OTS message, where a private key only signs a single message.

Similarly, as illustrated with respect to FIG. 1B, another HBS scheme is shown, where this one relates to multi-time signatures (MTS) scheme 150, where a private key can sign multiple messages.

Figure 2A:
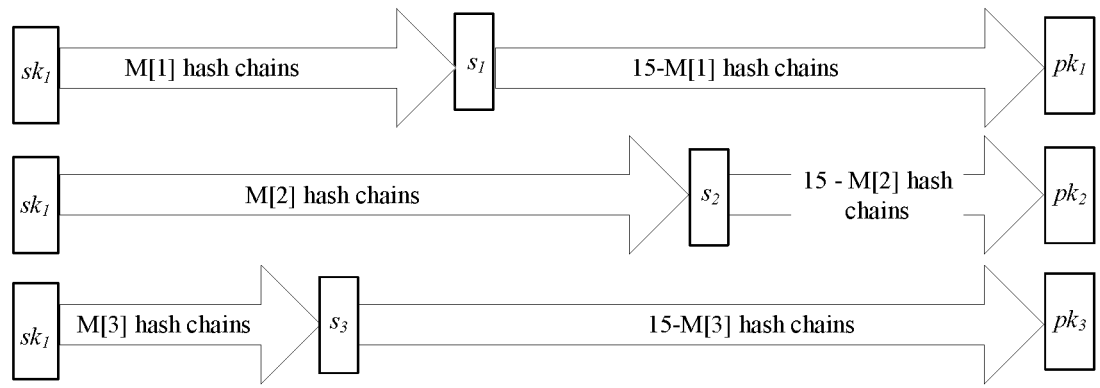
FIGS. 2A-2B are schematic illustrations of a one-time signature scheme and a multi-time signature scheme, respectively.
Figure 2A:
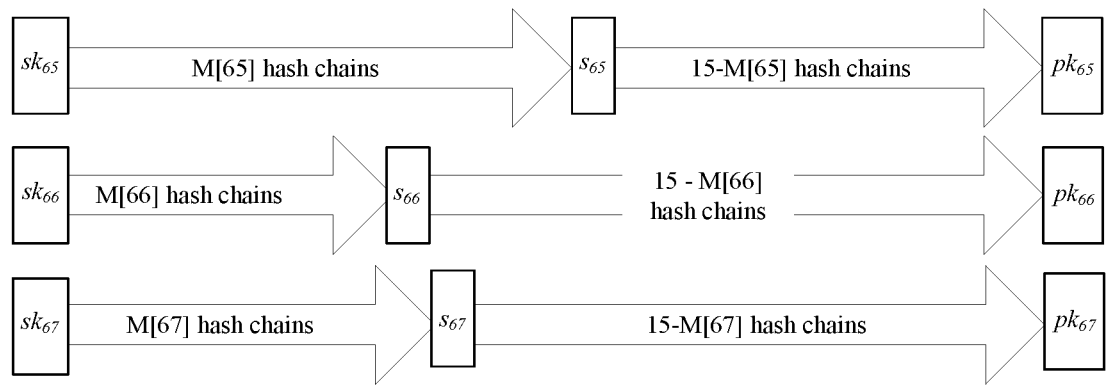
Figure 2B:
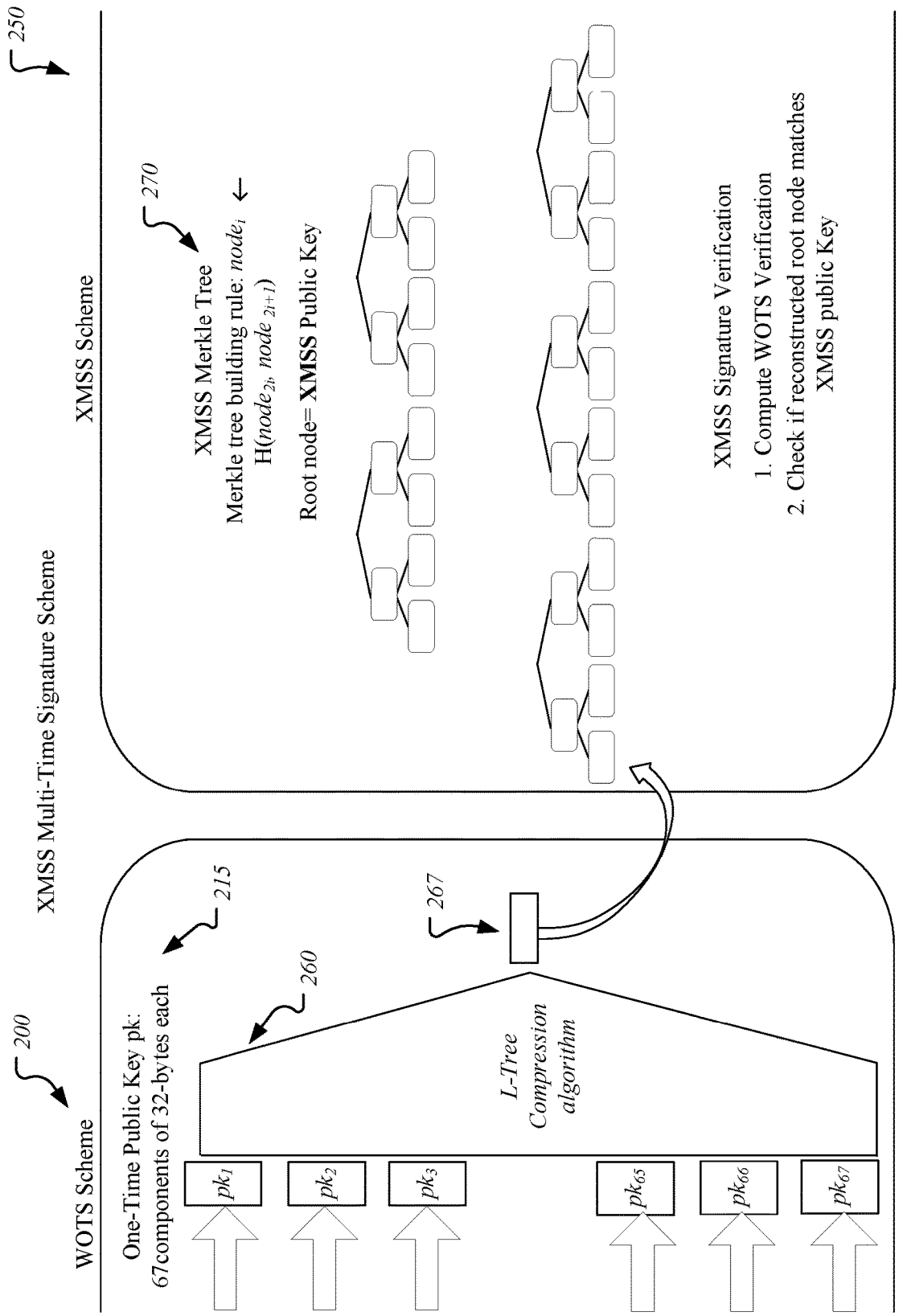

FIGS. 2A and 2B illustrate a one-time signature scheme and a multi-time signature scheme, respectively. Continuing with HBS-based OTS scheme 100 of FIG. 1A and MTS scheme 150 of FIG. 1B, FIG. 2A illustrates Winternitz OTS scheme 200, which was offered by Robert Winternitz of Stanford Mathematics Department publishing as hw(x) as opposed to h(x)|h(y), while FIG. 2B illustrates XMSS MTS scheme 250, respectively.

For example, WOTS scheme 200 of FIG. 2A provides for hashing and parsing of messages into M, with 67 integers between [0, 1, 2, . . . , 15], such as private key, sk, 205, signature, s, 210, and public key, pk, 215, with each having 67 components of 32 bytes each.

FIG. 2B illustrates XMSS MTS scheme 250 that allows for a combination of WOTS scheme 200 of FIG. 2A and XMSS scheme 255 having XMSS Merkle tree. As discussed previously with respect to FIG. 2A, WOTs scheme 200 is based on a one-time public key, pk, 215, having 67 components of 32 bytes each, that is then put through L-Tree compression algorithm 260 to offer WOTS compressed pk 265 to take a place in the XMSS Merkle tree of XMSS scheme 255. It is contemplated that XMSS signature verification may include computing WOTS verification and checking to determine whether a reconstructed root node matches the XMSS public key, such as root node=XMSS public key.

Accelerators for Post-Quantum Cryptography

Figure 3:
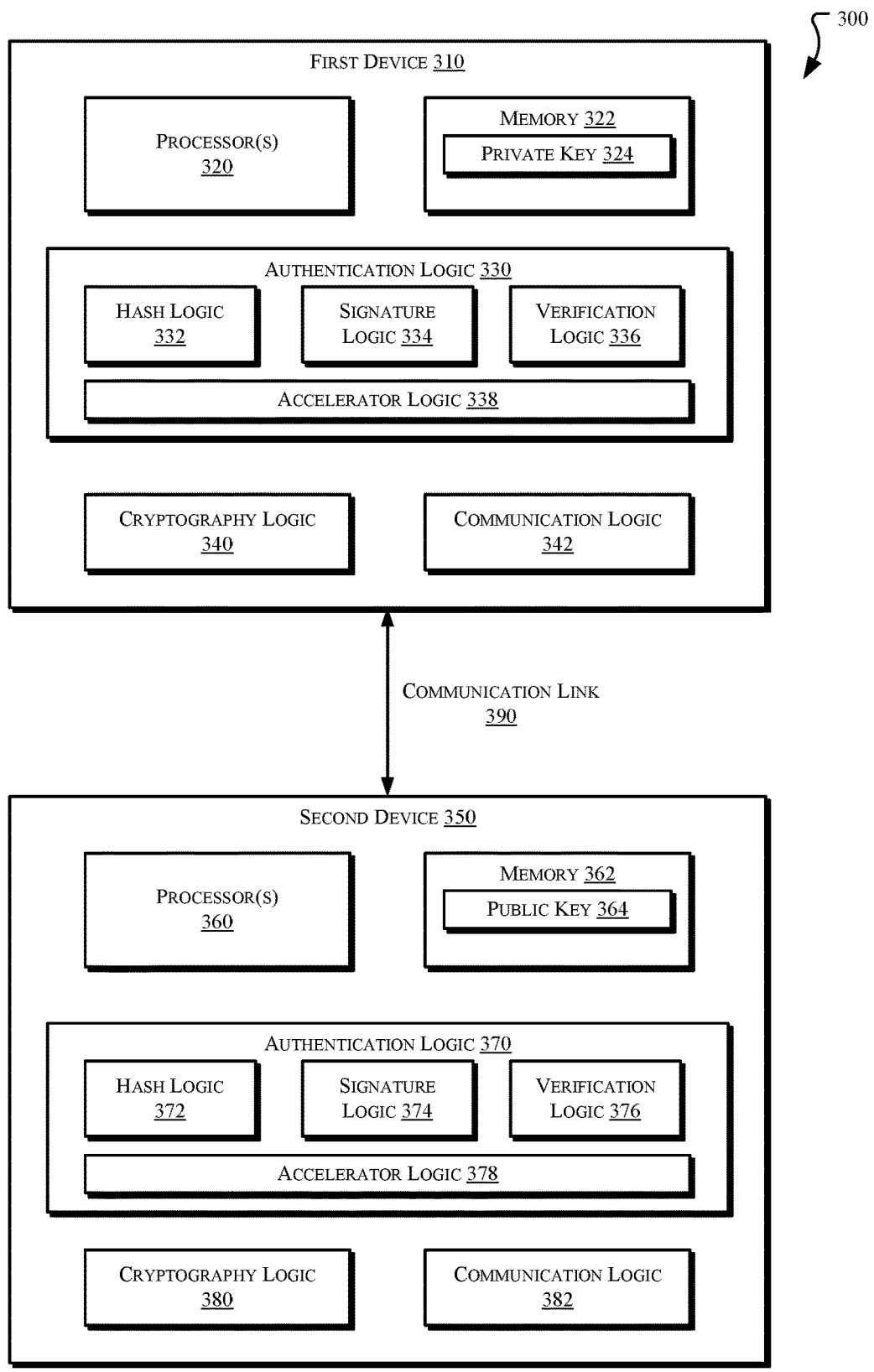
FIG. 3 is a schematic illustration of a signing device and a verifying device, in accordance with some examples.

FIG. 3 is a schematic illustration of a high-level architecture of a secure environment 300 that includes a first device 310 and a second device 350, in accordance with some examples. Referring to FIG. 3, each of the first device 310 and the second device 350 may be embodied as any type of computing device capable of performing the functions described herein. For example, in some embodiments, each of the first device 310 and the second device 350 may be embodied as a laptop computer, tablet computer, notebook, netbook, Ultrabook™, a smartphone, cellular phone, wearable computing device, personal digital assistant, mobile Internet device, desktop computer, router, server, workstation, and/or any other computing/communication device.

First device 310 includes one or more processor(s) 320 and a memory 322 to store a private key 324. The processor(s) 320 may be embodied as any type of processor capable of performing the functions described herein. For example, the processor(s) 320 may be embodied as a single or multi-core processor(s), digital signal processor, microcontroller, or other processor or processing/controlling circuit. Similarly, the memory 322 may be embodied as any type of volatile or non-volatile memory or data storage capable of performing the functions described herein. In operation, the memory 322 may store various data and software used during operation of the first device 310 such as operating systems, applications, programs, libraries, and drivers. The memory 322 is communicatively coupled to the processor(s) 320. In some examples the private key 324 may reside in a secure memory that may be part memory 322 or may be separate from memory 322.

First device 310 further comprises authentication logic 330 which includes hash logic 332, signature logic 334, and verification logic 336. Hash logic 332 is configured to hash (i.e., to apply a hash function to) a message (M) to generate a hash value (m') of the message M. Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

Signature logic 332 may be configured to generate a signature to be transmitted, i.e., a transmitted signature and/or to verify a signature. In instances in which the first device 310 is the signing device, the transmitted signature may include a number, L, of transmitted signature elements with each transmitted signature element corresponding to a respective message element. For example, for each message element, $m_i$, signature logic 332 may be configured to perform a selected signature operation on each private key element, $s_{ki}$ of the private key, $s_k$, a respective number of times related to a value of each message element, $m_i$ included in the message representative m'. For example, signature logic 332 may be configured to apply a selected hash function to a corresponding private key element, $s_{ki}$, $m_i$ times. In another example, signature logic 332 may be configured to apply a selected chain function (that contains a hash function) to a corresponding private key element, $s_{ki}$, $m_i$ times. The selected signature operations may, thus, correspond to a selected hash-based signature scheme.

Hash-based signature schemes may include, but are not limited to, a Winternitz (W) one time signature (OTS) scheme, an enhanced Winternitz OTS scheme (e.g., WOTS+), a Merkle many time signature scheme, an extended Merkle signature scheme (XMSS) and/or an extended Merkle multiple tree signature scheme (XMSS-MT), etc. Hash functions may include, but are not limited to SHA2-256 and/or SHA3-256, etc. For example, XMSS and/or XMSS-MT may comply or be compatible with one or more Internet Engineering Task Force (IETF®) informational draft Internet notes, e.g., draft draft-irtf-cfrg-xmss-hash-based-signatures-00, titled "XMSS: Extended Hash-Based Signatures, released April 2015, by the Internet Research Task Force, Crypto Forum Research Group of the IETF® and/or later and/or related versions of this informational draft, such as draft draft-irtf-cfrg-xmss-hash-based-signatures-06, released June 2016.

Winternitz OTS is configured to generate a signature and to verify a received signature utilizing a hash function. Winternitz OTS is further configured to use the private key and, thus, each private key element, $s_{ki}$, one time. For example, Winternitz OTS may be configured to apply a hash function to each private key element, $m_i$ or $N-m_i$ times to generate a signature and to apply the hash function to each received message element $N-m_{i'}$ or $m_{i'}$ times to generate a corresponding verification signature element. The Merkle many time signature scheme is a hash-based signature scheme that utilizes an OTS and may use a public key more than one time. For example, the Merkle signature scheme may utilize Winternitz OTS as the one-time signature scheme. WOTS+ is configured to utilize a family of hash functions and a chain function.

XMSS, WOTS+ and XMSS-MT are examples of hash-based signature schemes that utilize chain functions. Each chain function is configured to encapsulate a number of calls to a hash function and may further perform additional operations. The number of calls to the hash function included in the chain function may be fixed or may vary. Chain functions may improve security of an associated hash-based signature scheme.

Cryptography logic 340 is configured to perform various cryptographic and/or security functions on behalf of the signing device 310. In some embodiments, the cryptography logic 340 may be embodied as a cryptographic engine, an independent security co-processor of the signing device 310, a cryptographic accelerator incorporated into the processor(s) 320, or a standalone software/firmware. In some embodiments, the cryptography logic 340 may generate and/or utilize various cryptographic keys (e.g., symmetric/asymmetric cryptographic keys) to facilitate encryption, decryption, signing, and/or signature verification. Additionally, in some embodiments, the cryptography logic 340 may facilitate to establish a secure connection with remote devices over communication link. It should further be appreciated that, in some embodiments, the cryptography module 340 and/or another module of the first device 310 may establish a trusted execution environment or secure enclave within which a portion of the data described herein may be stored and/or a number of the functions described herein may be performed.

After the signature is generated as described above, the message, M, and signature may then be sent by first device 310, e.g., via communication logic 342, to second device 350 via network communication link 390. In an embodiment, the message, M, may not be encrypted prior to transmission. In another embodiment, the message, M, may be encrypted prior to transmission. For example, the message, M, may be encrypted by cryptography logic 340 to produce an encrypted message.

Second device 350 may also include one or more processors 360 and a memory 362 to store a public key 364. As described above, the processor(s) 360 may be embodied as any type of processor capable of performing the functions described herein. For example, the processor(s) 360 may be embodied as a single or multi-core processor(s), digital signal processor, microcontroller, or other processor or processing/controlling circuit. Similarly, the memory 362 may be embodied as any type of volatile or non-volatile memory or data storage capable of performing the functions described herein. In operation, the memory 362 may store various data and software used during operation of the second device 350 such as operating systems, applications, programs, libraries, and drivers. The memory 362 is communicatively coupled to the processor(s) 360.

In some examples the public key 364 may be provided to verifier device 350 in a previous exchange. The public key, $p_k$, is configured to contain a number L of public key elements, i.e., $p_k=[p_{k1}, \ldots, p_{kL}]$. The public key 364 may be stored, for example, to memory 362.

Second device 350 further comprises authentication logic 370 which includes hash logic 372, signature logic, and verification logic 376. As described above, hash logic 372 is configured to hash (i.e., to apply a hash function to) a message (M) to generate a hash message (m'). Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

In instances in which the second device is the verifying device, authentication logic 370 is configured to generate a verification signature based, at least in part, on the signature received from the first device and based, at least in part, on the received message representative (m'). For example, authentication logic 370 may configured to perform the same signature operations, i.e., apply the same hash function or chain function as applied by hash logic 332 of authentication logic 330, to each received message element a number, $N-m_{i'}$ (or $m_{i'}$), times to yield a verification message element. Whether a verification signature, i.e., each of the L verification message elements, corresponds to a corresponding public key element, $p_{ki}$, may then be determined. For example, verification logic 370 may be configured to compare each verification message element to the corresponding public key element, $p_{ki}$. If each of the verification message element matches the corresponding public key element, $p_{ki}$, then the verification corresponds to success. In other words, if all of the verification message elements match the public key elements, $p_{k1}, \ldots, p_{kL}$, then the verification corresponds to success. If any verification message element does not match the corresponding public key element, $p_{ki}$, then the verification corresponds to failure.

As described in greater detail below, in some examples the authentication logic 330 of the first device 310 includes one or more accelerators 338 that cooperate with the hash logic 332, signature logic 334 and/or verification logic 336 to accelerate authentication operations. Similarly, in some examples the authentication logic 370 of the second device 310 includes one or more accelerators 378 that cooperate with the hash logic 372, signature logic 374 and/or verification logic 376 to accelerate authentication operations. Examples of accelerators are described in the following paragraphs and with reference to the accompanying drawings.

The various modules of the environment 300 may be embodied as hardware, software, firmware, or a combination thereof. For example, the various modules, logic, and other components of the environment 300 may form a portion of, or otherwise be established by, the processor(s) 320 of first device 310 or processor(s) 360 of second device 350, or other hardware components of the devices As such, in some embodiments, one or more of the modules of the environment 300 may be embodied as circuitry or collection of electrical devices (e.g., an authentication circuitry, a cryptography circuitry, a communication circuitry, a signature circuitry, and/or a verification circuitry). Additionally, in some embodiments, one or more of the illustrative modules may form a portion of another module and/or one or more of the illustrative modules may be independent of one another.

Figure 4A:
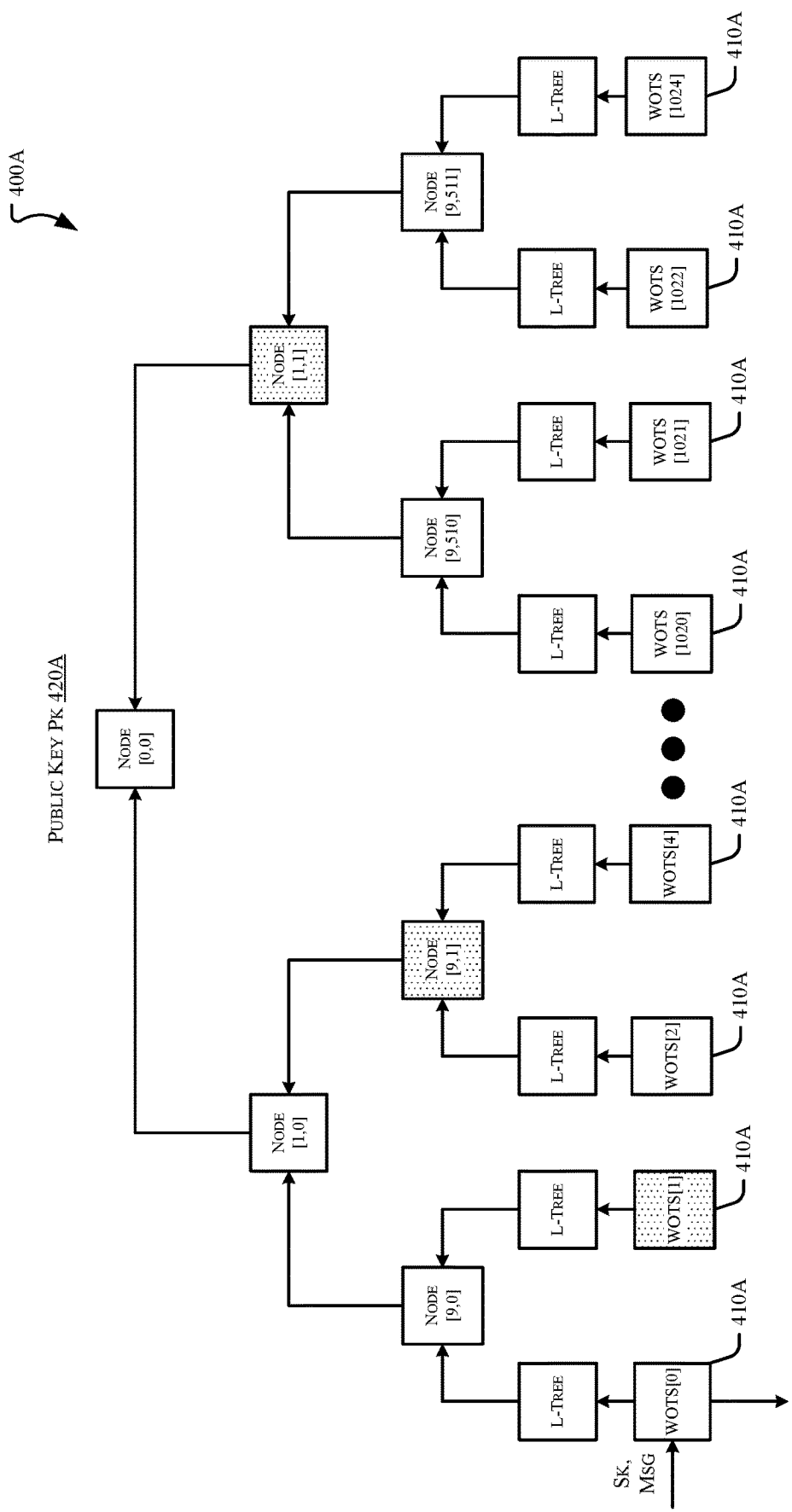
FIG. 4A is a schematic illustration of a Merkle tree structure, in accordance with some examples.

FIG. 4A is a schematic illustration of a Merkle tree structure illustrating signing operations, in accordance with some examples. Referring to FIG. 4A, an XMSS signing operation requires the construction of a Merkle tree 400A using the local public key from each leaf WOTS node 410 to generate a global public key (PK) 420. In some examples the authentication path and the root node value can be computed off-line such that these operations do not limit performance. Each WOTS node 410 has a unique secret key, "sk" which is used to sign a message only once. The XMSS signature consists of a signature generated for the input message and an authentication path of intermediate tree nodes to construct the root of the Merkle tree.

Figure 4B:
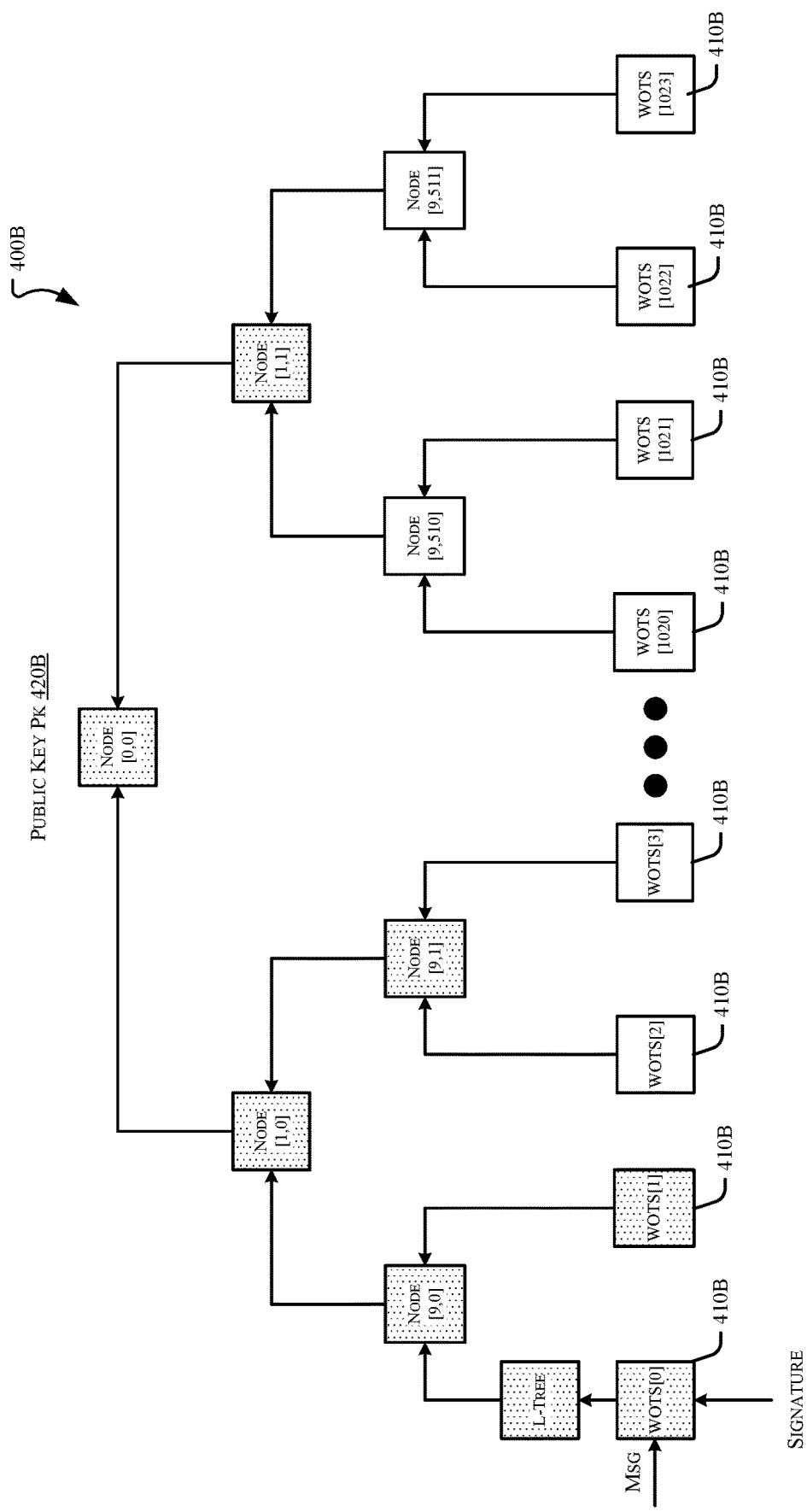
FIG. 4B is a schematic illustration of a Merkle tree structure, in accordance with some examples.

FIG. 4B is a schematic illustration of a Merkle tree structure 400B during verification, in accordance with some examples. During verification, the input message and signature are used to compute the local public key 420B of the WOTS node, which is further used to compute the tree root value using the authentication path. A successful verification will match the computed tree root value to the public key PK shared by the signing entity. The WOTS and L-Tree operations constitute a significant portion of the XMSS sign/verify latency thus defining the overall performance of the authentication system. Described herein are various pre-computation techniques which may be implemented to speed-up WOTS and L-Tree operations, thereby improving XMSS performance. The techniques are applicable to the other hash options and scale well for both software and hardware implementations.

Figure 5:
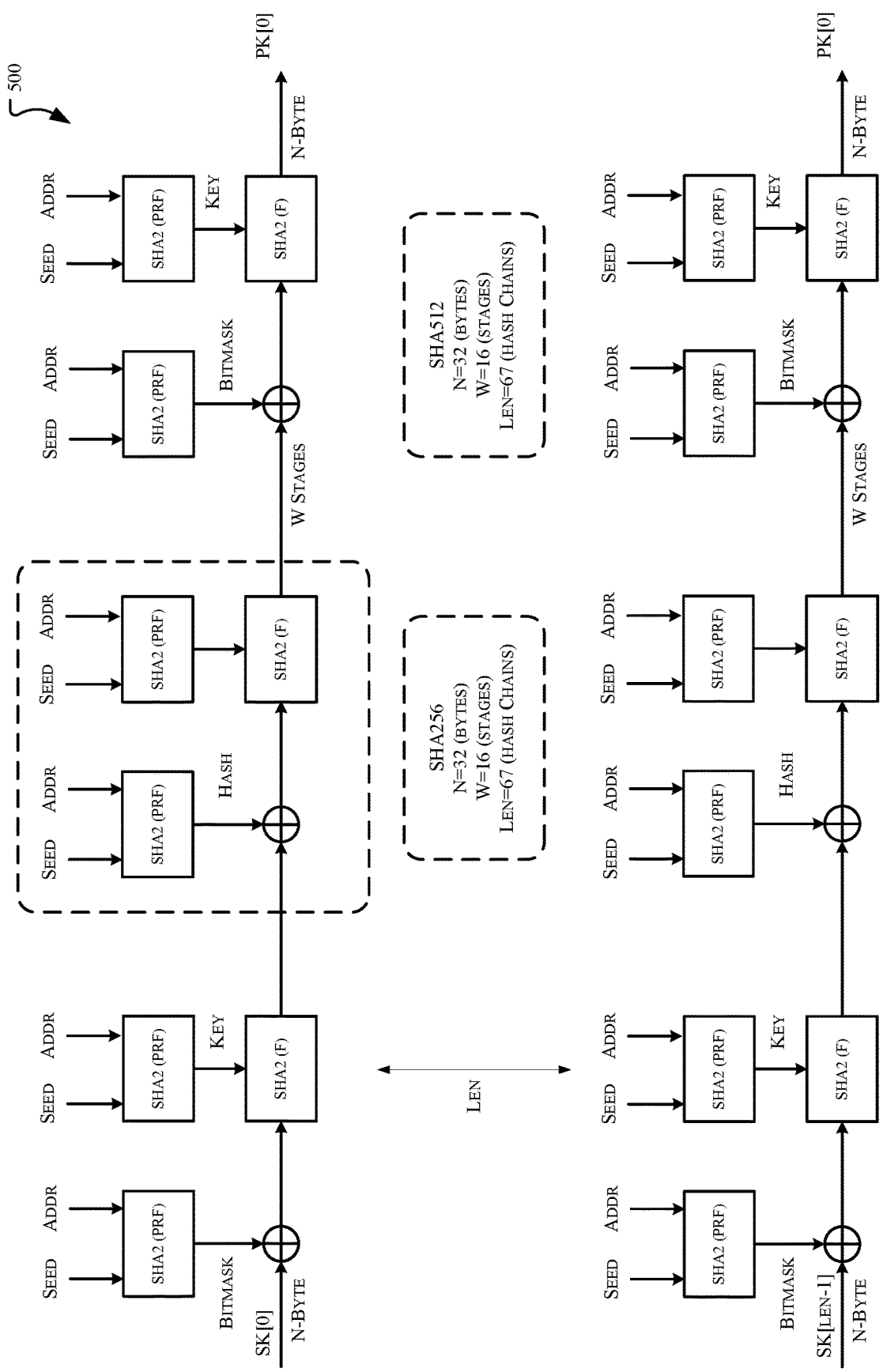
FIG. 5 is a schematic illustration of a compute blocks in an architecture to implement a signature algorithm, in accordance with some examples.

FIG. 5 is a schematic illustration of a compute blocks in an architecture 500 to implement a signature algorithm, in accordance with some examples. Referring to FIG. 5, the WOTS+ operation involves 67 parallel chains of 16 SHA2-256 HASH functions, each with the secret key sk[66:0] as input. Each HASH operation in the chain consists of 2 pseudo-random functions (PRF) using SHA2-256 to generate a bitmask and a key. The bitmask is XOR-ed with the previous hash and concatenated with the key as input message to a 3rd SHA2-256 hash operation. The 67×32-byte WOTS public key pk[66:0] is generated by hashing secret key sk across the 67 hash chains.

Figure 6A:
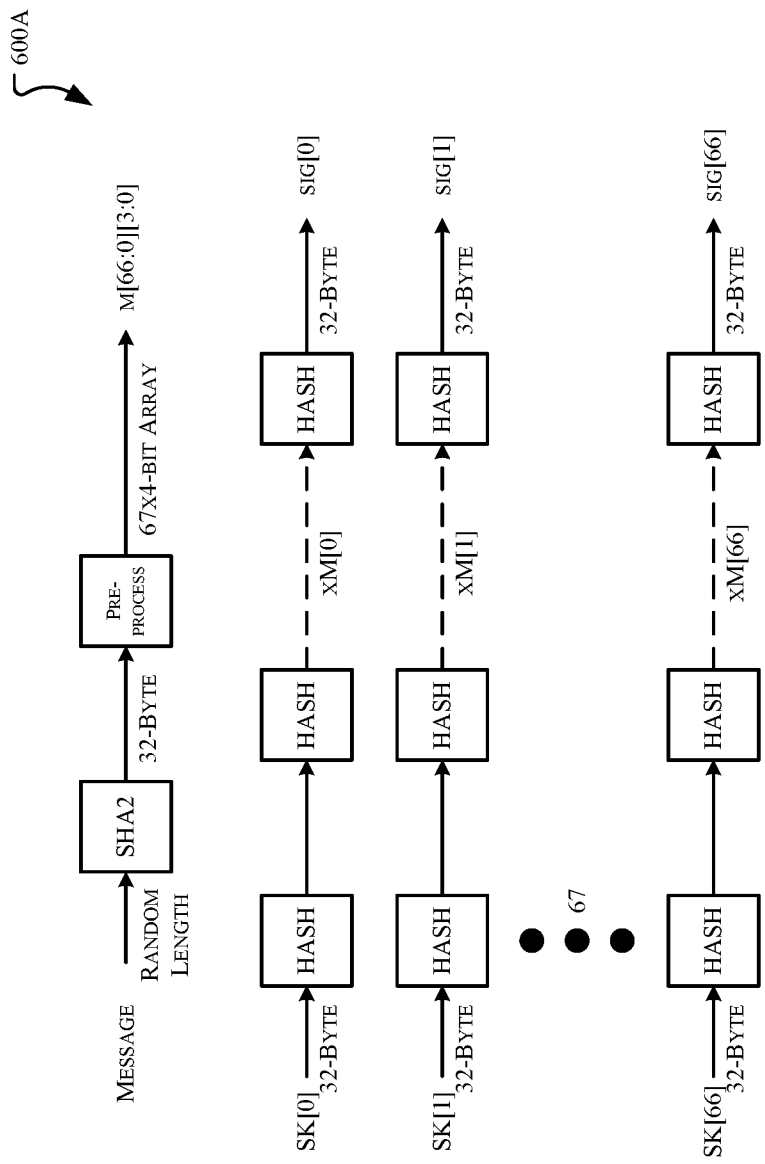
FIG. 6A is a schematic illustration of a compute blocks in an architecture to implement signature generation in a signature algorithm, in accordance with some examples.

FIG. 6A is a schematic illustration of a compute blocks in an architecture 600A to implement signature generation in a signature algorithm, in accordance with some examples. As illustrated in FIG. 6A, for message signing, the input message is hashed and pre-processed to compute a 67×4-bit value, which is used as an index to choose an intermediate hash value in each chain.

Figure 6B:
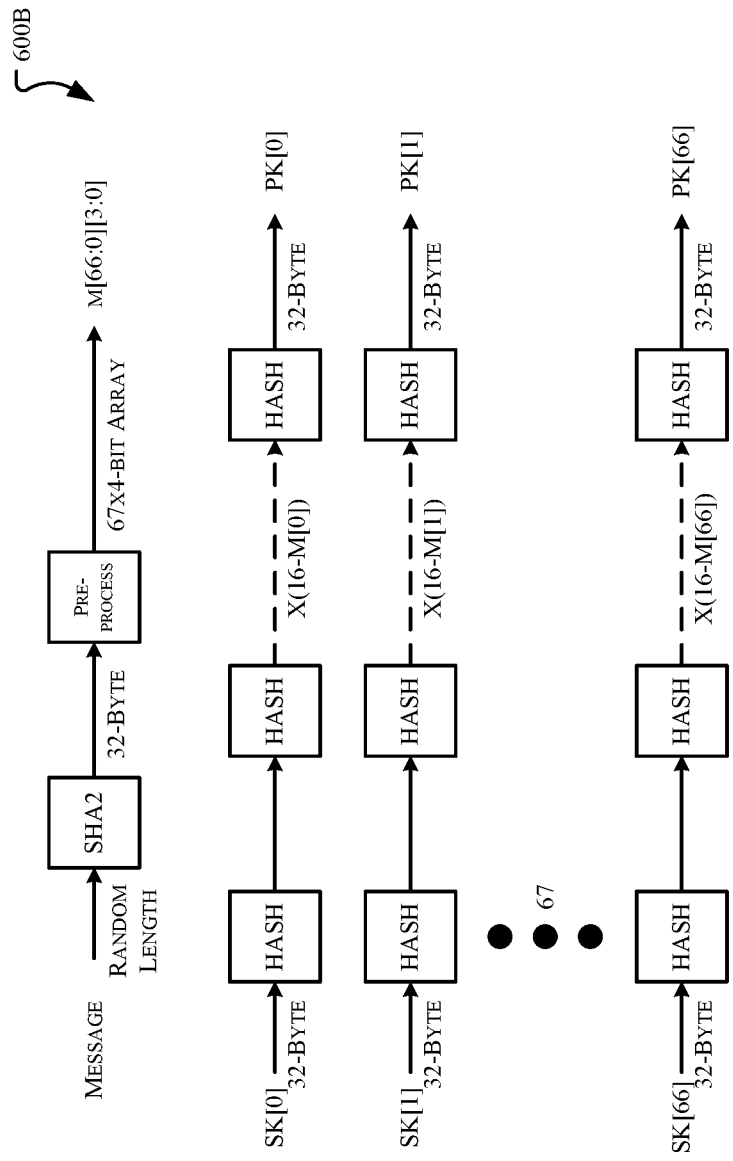
FIG. 6B is a schematic illustration of a compute blocks in an architecture to implement signature verification in a verification algorithm, in accordance with some examples.

FIG. 6B is a schematic illustration of a compute blocks in an architecture 600B to implement signature verification in a verification algorithm, in accordance with some examples. Referring to FIG. 6B, during verification, the message is again hashed to compute the signature indices and compute the remaining HASH operations in each chain to compute the WOTS public key pk. This value and the authentication path are used to compute the root of the Merkle tree and compare with the shared public key PK to verify the message.

As mentioned above, conventional multi-hash SHA2-256 implementations do not consider the length of hash chains when scheduling hash operations during WOTS sign/verify operation. As a result, the longest WOTS chain in a group of chain operations determines the amount of time required to execute the group. Further, because hash engine operations are commonly scheduled in a batch mode, the hash engines that process hash chains that are relatively shorter remain idle while the hash engines that process hash chains that are relatively longer execute, thereby limiting the overall performance of a WOTS signature/verification algorithm. This leads to sub-optimal usage of the hash engines available.

Subject matter described herein addresses these and other issues by providing systems and methods to implement an index aware hash scheduler that groups hash chain operations by the hash-chain length distribution to minimize, or at least to reduce, overall WOTS signature/verification latency. In some examples an index aware hash distribution algorithm sorts the hash chain operations by chain lengths and schedules them in a coordinated fashion across multiple SHA2-256 hash engines to minimize, or at least to reduce, the overall cost of WOTS signature/verification performance.

As described above, the XMSS signature/verification scheme uses a WOTS one-time signature scheme as a building block. Each XMSS sign and verify operation consists of one call to WOTS sign and verify algorithm, respectively, followed by additional steps (i.e., related to the Merkle tree). The WOTS keygen, sign and verify algorithms have all a similar structure in that they operate over L components of n-bytes each, where L and n are parameters of the cryptosystem. Each component is processed by the chain-function, which is a recursive function defined in Internet Engineering Task Force (IETF) 2018RFC-8391. For each component, the chain function calls itself a number of times that depends on the message component value of same index, which is between 0 and 15 (greater the message value, grater the recursion depth). Each chain iteration results in three calls to the hash function (e.g., SHA2-256).

Figure 7A:
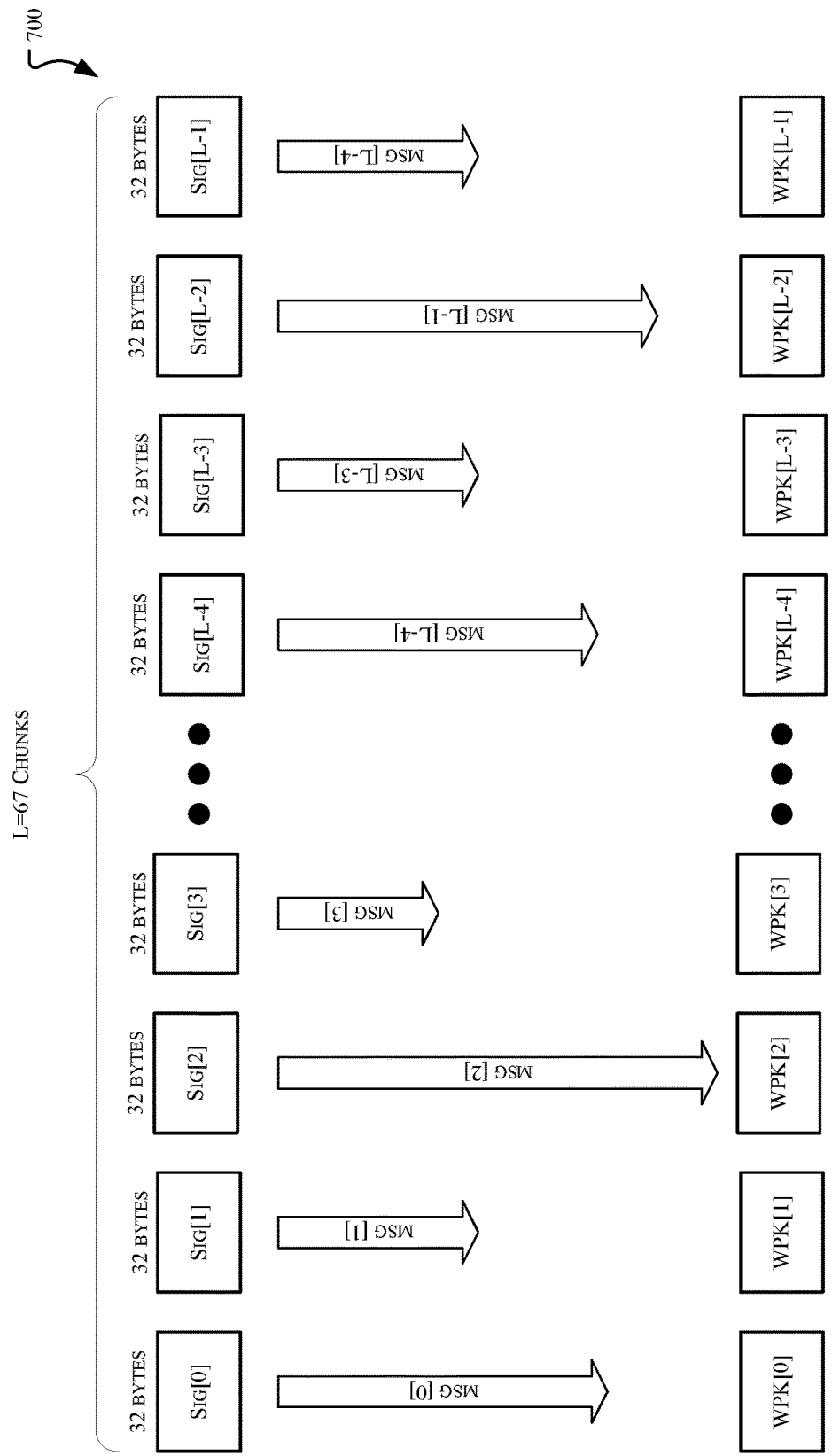
FIGS. 7A, 7B, 7C, and 7D are schematic illustrations of a chain function being applied to signature components in WOTS signature verification, in accordance with some examples.

FIG. 7A is a schematic illustration of a WOTS signature/verification operation 700 having L signature components. To illustrate the number of hash calls this operation requires, consider that the mandatory XMSS parameter set which specifies L=67 signature components, SHA2-256 as the hash function (n=32), the message component values ranging between 0 and 15, and the hash message size is 128 bytes. Assuming an average message component value of 8, (i.e., (15−0)/2=8), this process requires 67×8×3=1,608 calls to SHA2-256, and each hash call will require at least two SHA-256 compression function calls since the input is 128 bytes long (i.e., 2×1,608=3,216 calls to the SHA-256 compression function). Thus, WOTS signature/verification is a computationally expensive process that, if implemented as specified in RFC-8391, does not offer material parallelization opportunities.

Described herein are techniques to optimize, or at least to improve, XMSS signature generation and verification operations. Broadly, in some examples signature components which have associated message values that are relatively close may be assigned to a group and executed together. In some examples the message values may be sorted in ascending, while in other examples the message values may be sorted in descending order.

Techniques to implement message index aware multi-hash accelerators for post-quantum cryptography secure hash-based signing and verification will be described with reference to the flowchart illustrated in FIG. 9 and the diagrams illustrated in FIGS. 7B-7C and 8A-8B. In some examples the operations depicted in FIG. 9 may be implemented by the acceleration logic 338 of first device 310 and/or the acceleration logic 378 of second device 350. For example, if the first device 310 is functioning as a signing device then the accelerator logic 338 may implement operations to accelerate the WOTS operations in a signature process, and if the second device 350 is functioning as a verifying device then the accelerator logic 378 may implement operations to accelerate the WOTS operations in a verification process.

In the interest of clarity, operations will be explained with reference to a WOTS signature operation executed by first device 310. Referring to FIG. 9, at operation 910 a WOTS sign operation is received in authentication logic 330. At operation 915 the accelerator logic 338 identifies the lengths of the various hash chains in the signature operation, and at operation 920 the accelerator logic 338 sorts the hash chain operations according to their respective hash chain message lengths. The hash chain operations may be sorted in ascending order or in descending order.

At operation 925 the accelerator logic 338 groups the hash chain operations according to the hash chain message length, such that hash operations that have messages that are similar in length are assigned to the same group(s) for execution contemporaneously (operation 930).

Figure 7B:
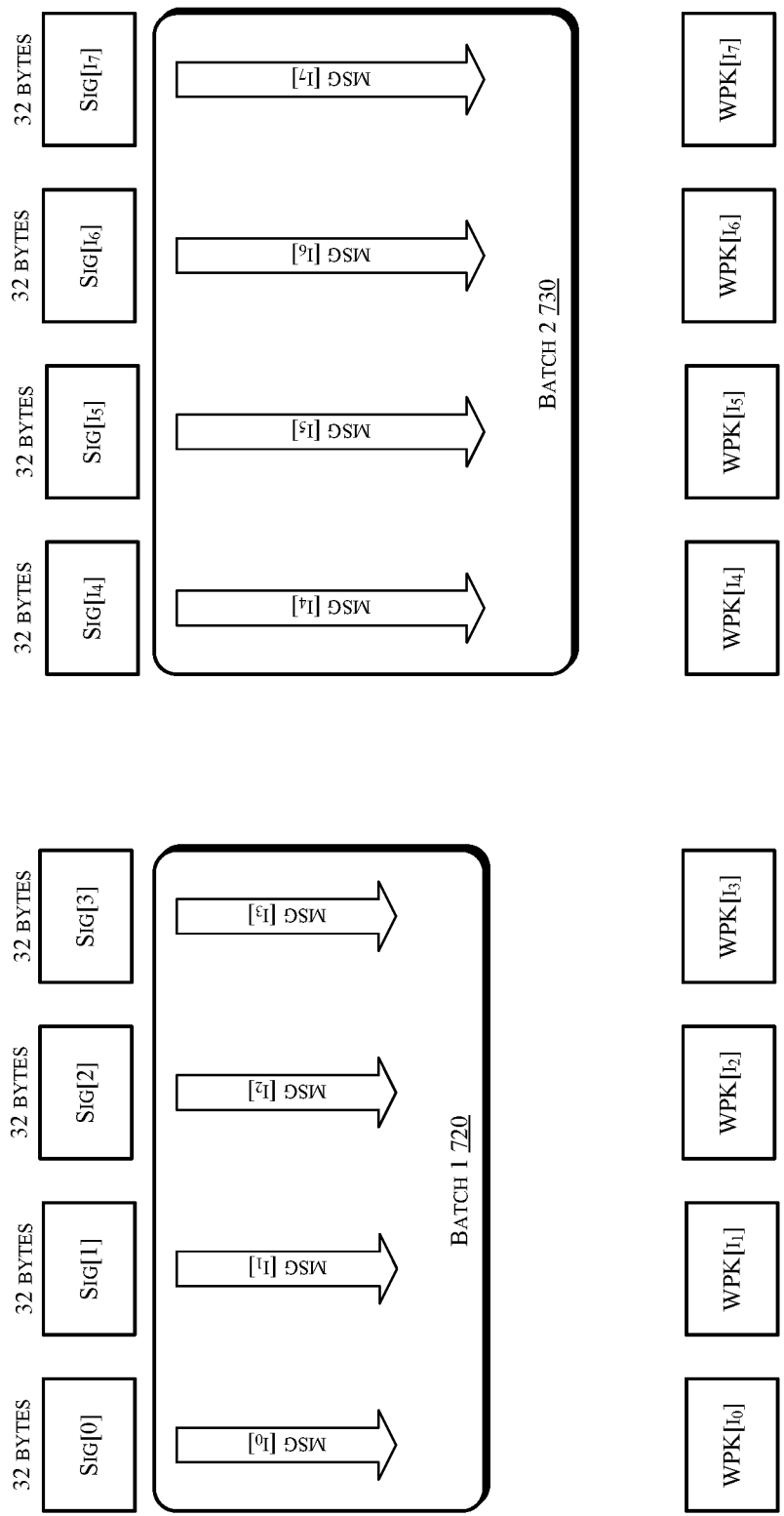

In a software-based implementation of authentication logic 330, once WOTS chains are selected to be processed in the same batch, the hash engines in the signature logic 334 are locked until all WOTS chains in the batch are complete. Therefore, one goal is to minimize, or at least to reduce, the idle time of the hash engines in signature logic 334. FIG. 7B illustrates an example of benefits of applying an accelerator to group components of increasing associated message value in an implementation equipped with four hash engines. In the example depicted in FIG. 7B the signature components have been sorted into a first batch 720 and a second batch 730 based on the ascending order of the associated message components. As illustrated in FIG. 7B, the first batch 720 comprises four messages (msg[$i_0$], msg[$i_1$], msg[$i_2$], msg[$i_3$]) all of which are of approximately the same message length. Similarly, the second batch 730 comprises four messages (msg[$i_4$], msg[$i_5$], msg[$i_6$], msg[$i_7$]) all of which are of approximately the same message length. The sorting process produces a list of indexes, i, so that msg[$i_j$]≤msg[$i_{j+1}$], for all j∈[0 . . . (L−1)]. The list of indexes i is applied to both signature and WPK components. Such sorting algorithms are highly efficient, having a complexity that is O(n1) for n inputs. In particular for this case where the list is small (only L=67 elements), thus computational cost of sorting is negligible compared to the overall computational cost of XMSS signature and/or verification operations.

In the examples depicted in FIGS. 7A and 4B, all chain functions treated in batch 1 720 have approximately the same length and thus should terminate contemporaneously. Similarly, all chain functions treated in batch 2 730 have approximately the same length and thus should terminate contemporaneously. Therefore, no hash engines should be left unused at any time, which represents an optimal situation. This is an optimal case and it is not guaranteed to happen all the time, however, conventional XMSS parameters favor this situation. The mandatory XMSS parameter suggests L=67 and msg[i]∈[0 . . . 15], thus on average 67/16=4.18 components will have the same message value. This is close to 4, which divides the usual number of buffers available for multi-engine hash implementations which utilize either 4 or 8 has engines.

Figures 7C, 7D:
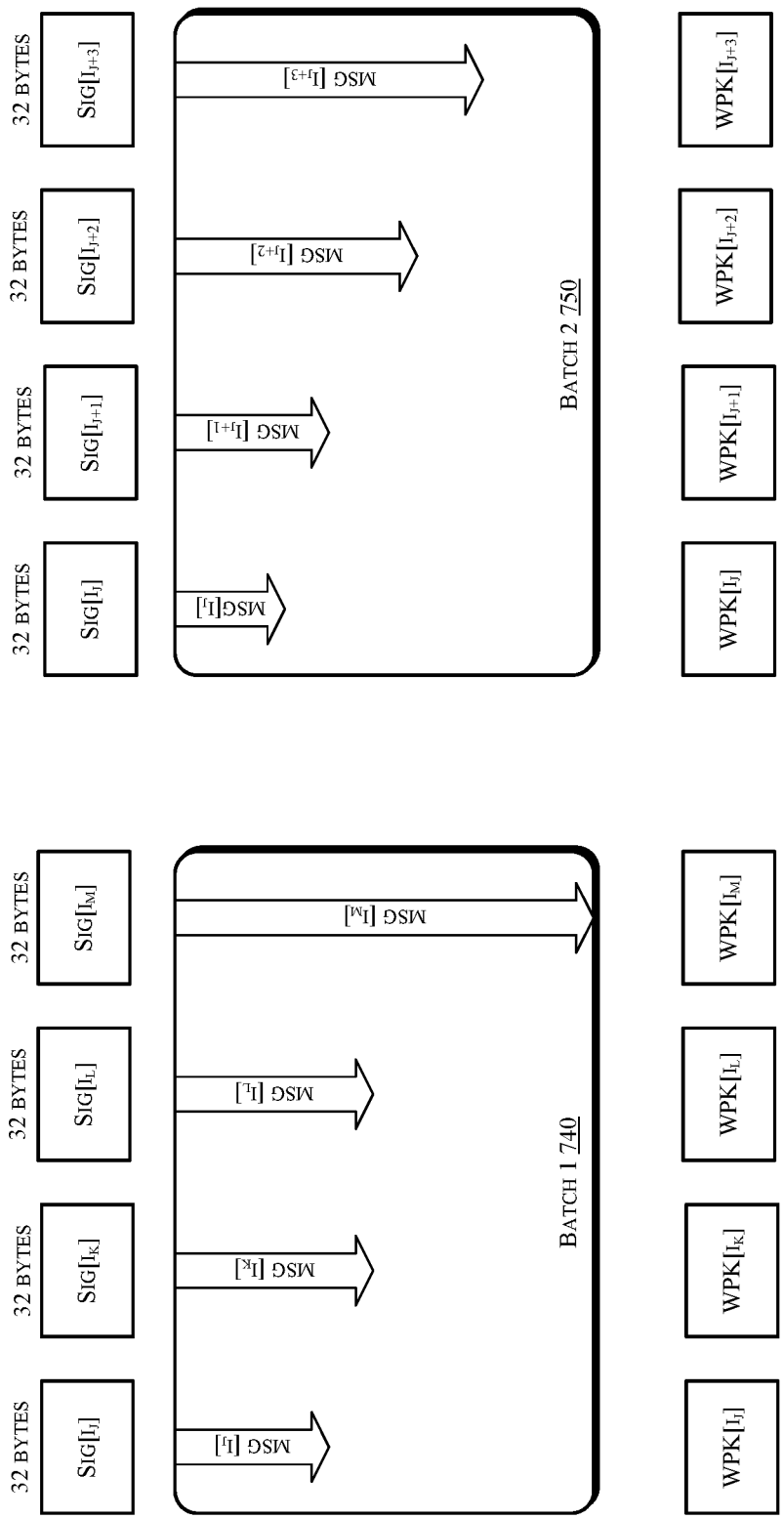

FIG. 7C illustrates the worst-case scenario in an unsorted batch 740 of chain functions. As illustrated in FIG. 7C, the shortest chain length (msg[$i_j$]) is significantly different from the longest chain length (msg[$i_m$]), thereby resulting in a significant amount of idle time for the hash engines which process messages msg[$i_j$], msg[$i_k$] and msh[$i_l$]. FIG. 7D illustrates that, even when the message values are different, sorting them in increasing order reduces the difference between the message chain having the longest chain length and the chain having the shortest chain length.

Figures 8A, 8B:
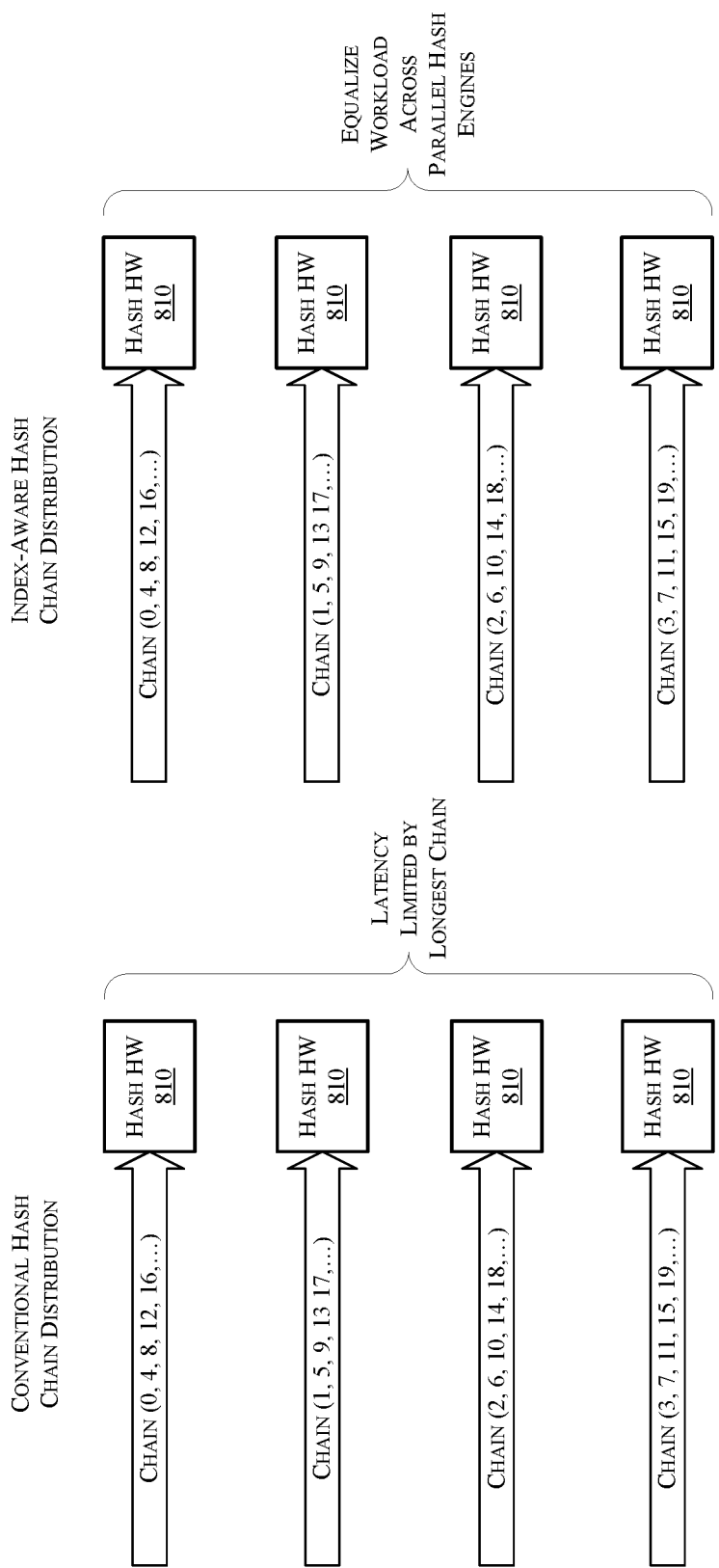
FIG. 8A is a schematic illustration of conventional hash-chain distribution, in accordance with some examples.
FIG. 8B is a schematic illustration of index-aware hash-chain distribution, in accordance with some examples.
Figure 9:
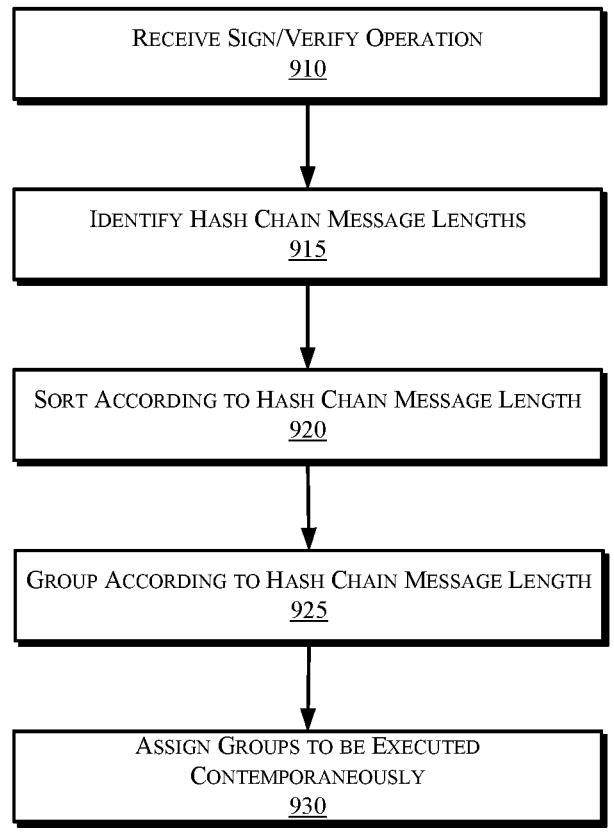
FIG. 9 is a schematic illustration of a flow diagram illustrating operations to implement index-aware hash chain distribution, in accordance with some examples.

FIG. 8A is a schematic illustration of conventional hash-chain distribution, in accordance with some examples. Referring to FIG. 8A, in a conventional implementation hash chains are input to hash hardware 810 without regard to the length of the respective hash chains. Thus, the latency of the has hash operation is limited by the hash chain which has the longest length. FIG. 8B is a schematic illustration of index-aware hash-chain distribution, in accordance with some examples. In contrast to FIG. 8A, the hash chains in FIG. 8B have been sorted and grouped as described above in an attempt to equalize the workload of the hash hardware 810, thereby reducing the latency associated with hash operations.

By way of example, an index-aware distribution technique may be applied to a WOTS verify operation which has sixteen (16) hash chains and four (4) parallel HASH engines. Assume the sixteen chains have the following lengths during verification based on the hash value of the input message.

TABLE I

| Chain number | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Chain length | 7 | 12 | 13 | 8 | 3 | 11 | 9 | 5 | 1 | 6 | 2 | 3 | 6 | 14 | 3 | 13 |

In a conventional in-order scheduling, the hash chains will be sequentially deployed on the four parallel HASH accelerators, as illustrated in FIG. 8A. The WOTS sign performance is limited by the worst latency of the four engines, which in this case is 42. It is also clear that there is an approximate 33% difference between the fastest and slowest combination of workload.

TABLE II

| Workload Latencies | 1 | 2 | 3 | 4 | Total latency |
|---|---|---|---|---|---|
| HASH engine 1 | 7 | 3 | 1 | 6 | 17 |
| HASH engine 2 | 12 | 11 | 6 | 14 | 43 |
| HASH engine 3 | 13 | 9 | 2 | 3 | 27 |
| HASH engine 4 | 8 | 5 | 3 | 13 | 29 |

Another conventional technique is to schedule the chains in run-time depending on which engine is available. While this technique reduces the mismatch in workload difference, the scheduling efficiency is still not equal to the theoretical maximum.

TABLE III

| Workload Latencies | 1 | 2 | 3 | 4 | 5 | Total latency |
|---|---|---|---|---|---|---|
| HASH engine 1 | 7 | 3 | 9 | 3 | 13 | 35 |
| HASH engine 2 | 12 | 5 | 2 | 6 | 0 | 25 |
| HASH engine 3 | 13 | 1 | 6 | 3 | 0 | 23 |
| HASH engine 4 | 8 | 11 | 14 | 0 | 0 | 33 |

As described above, in an index aware hash scheduling algorithm, the has chains are sorted in order of their respective chain lengths. The hash chains then may be deployed on the four engines alternatingly in the ascending and descending order. This ensures that the hash engine getting the shortest chains also gets the longest chains and hence attempts to equalize the latency across the four has engines. Thus, index aware hash distribution provides performance improvement by limiting the difference between fastest and slowest workload combination.

TABLE IV

| Sorted Chain Length | 1 | 2 | 3 | 3 | 3 | 5 | 6 | 6 | 7 | 8 | 9 | 11 | 12 | 13 | 13 | 14 |
|---|---|---|---|---|---|---|---|---|---|---|---|---|---|---|---|---|

TABLE V

| Workload Latencies | 1 | 2 | 3 | 4 | Total latency |
|---|---|---|---|---|---|
| HASH engine 1 | 1 | 14 | 3 | 11 | 29 |
| HASH engine 2 | 2 | 13 | 5 | 9 | 29 |
| HASH engine 3 | 3 | 13 | 6 | 8 | 30 |
| HASH engine 4 | 3 | 12 | 6 | 7 | 28 |

A similar index aware hash scheduling technique can be applied during WOTS signing operations by sorting the signature chain lengths. The index aware hash scheduling techniques can be extended to software and micro-code implementations, as well as any underlying hash algorithm, like SHA2-512 or SHAKE-128, as specified in XMSS.

Figure 10:
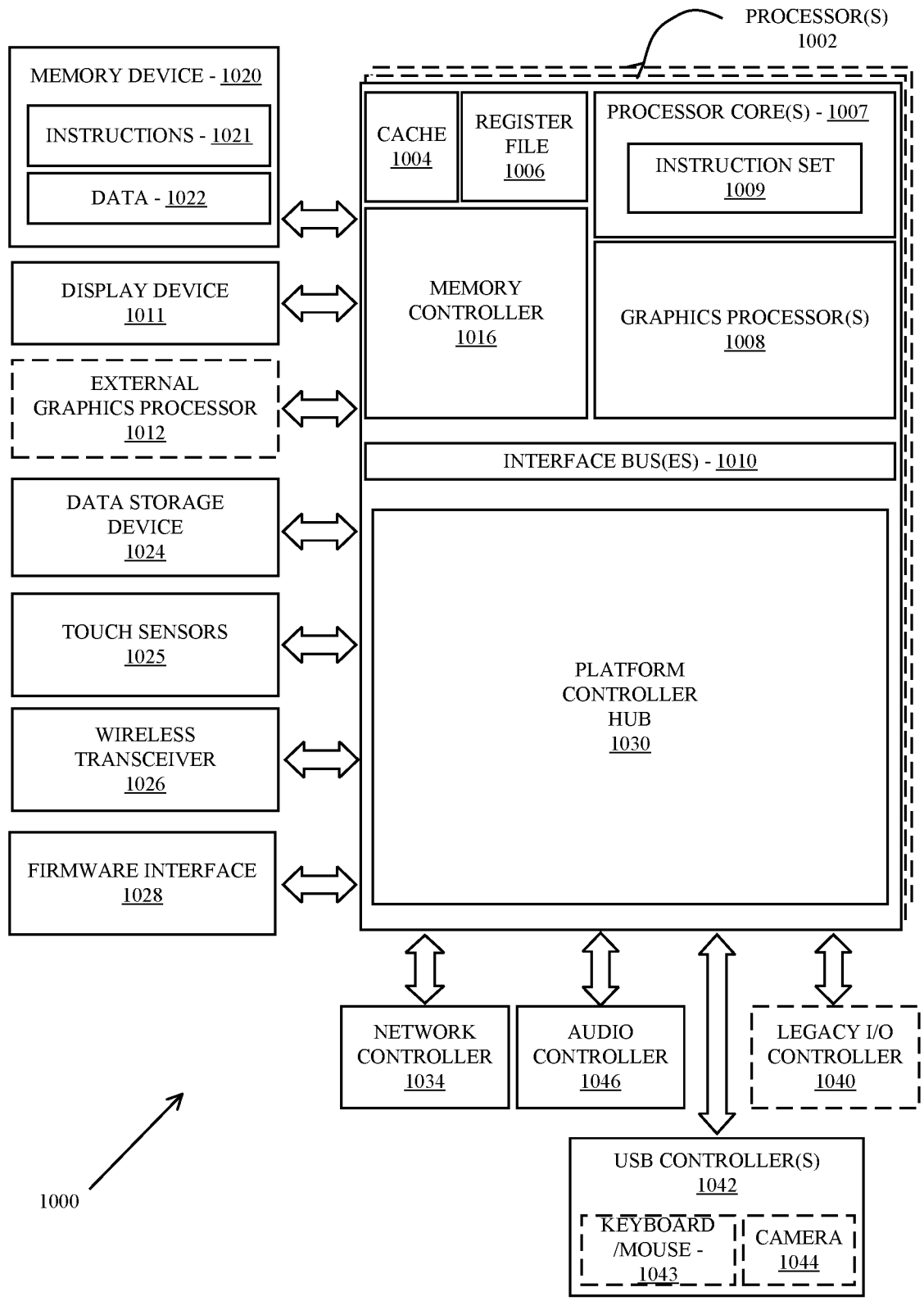
FIG. 10 is a schematic illustration of a computing architecture which may be adapted to implement index-aware hash chain distribution in accordance with some examples.

FIG. 10 illustrates an embodiment of an exemplary computing architecture that may be suitable for implementing various embodiments as previously described. In various embodiments, the computing architecture 1000 may comprise or be implemented as part of an electronic device. In some embodiments, the computing architecture 1000 may be representative, for example of a computer system that implements one or more components of the operating environments described above. In some embodiments, computing architecture 1000 may be representative of one or more portions or components of a DNN training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 includes one or more processors 1002 and one or more graphics processors 1008, and may be a single processor desktop system, a multiprocessor workstation system, or a server system having a large number of processors 1002 or processor cores 1007. In on embodiment, the system 1000 is a processing platform incorporated within a system-on-a-chip (SoC or SOC) integrated circuit for use in mobile, handheld, or embedded devices.

An embodiment of system 1000 can include, or be incorporated within a server-based gaming platform, a game console, including a game and media console, a mobile gaming console, a handheld game console, or an online game console. In some embodiments system 1000 is a mobile phone, smart phone, tablet computing device or mobile Internet device. Data processing system 1000 can also include, couple with, or be integrated within a wearable device, such as a smart watch wearable device, smart eyewear device, augmented reality device, or virtual reality device. In some embodiments, data processing system 1000 is a television or set top box device having one or more processors 1002 and a graphical interface generated by one or more graphics processors 1008.

In some embodiments, the one or more processors 1002 each include one or more processor cores 1007 to process instructions which, when executed, perform operations for system and user software. In some embodiments, each of the one or more processor cores 1007 is configured to process a specific instruction set 1009. In some embodiments, instruction set 1009 may facilitate Complex Instruction Set Computing (CISC), Reduced Instruction Set Computing (RISC), or computing via a Very Long Instruction Word (VLIW). Multiple processor cores 1007 may each process a different instruction set 1009, which may include instructions to facilitate the emulation of other instruction sets. Processor core 1007 may also include other processing devices, such a Digital Signal Processor (DSP).

In some embodiments, the processor 1002 includes cache memory 1004. Depending on the architecture, the processor 1002 can have a single internal cache or multiple levels of internal cache. In some embodiments, the cache memory is shared among various components of the processor 1002. In some embodiments, the processor 1002 also uses an external cache (e.g., a Level-3 (L3) cache or Last Level Cache (LLC)) (not shown), which may be shared among processor cores 1007 using known cache coherency techniques. A register file 1006 is additionally included in processor 1002 which may include different types of registers for storing different types of data (e.g., integer registers, floating point registers, status registers, and an instruction pointer register). Some registers may be general-purpose registers, while other registers may be specific to the design of the processor 1002.

In some embodiments, one or more processor(s) 1002 are coupled with one or more interface bus(es) 1010 to transmit communication signals such as address, data, or control signals between processor 1002 and other components in the system. The interface bus 1010, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 1002 include an integrated memory controller 1016 and a platform controller hub 1030. The memory controller 1016 facilitates communication between a memory device and other components of the system 1000, while the platform controller hub (PCH) 1030 provides connections to I/O devices via a local I/O bus.

Memory device 1020 can be a dynamic random-access memory (DRAM) device, a static random-access memory (SRAM) device, flash memory device, phase-change memory device, or some other memory device having suitable performance to serve as process memory. In one embodiment the memory device 1020 can operate as system memory for the system 1000, to store data 1022 and instructions 1021 for use when the one or more processors 1002 executes an application or process. Memory controller hub 1016 also couples with an optional external graphics processor 1012, which may communicate with the one or more graphics processors 1008 in processors 1002 to perform graphics and media operations. In some embodiments a display device 1011 can connect to the processor(s) 1002. The display device 1011 can be one or more of an internal display device, as in a mobile electronic device or a laptop device or an external display device attached via a display interface (e.g., DisplayPort, etc.). In one embodiment the display device 1011 can be a head mounted display (HMD) such as a stereoscopic display device for use in virtual reality (VR) applications or augmented reality (AR) applications.

In some embodiments the platform controller hub 1030 enables peripherals to connect to memory device 1020 and processor 1002 via a high-speed I/O bus. The I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). The data storage device 1024 can connect via a storage interface (e.g., SATA) or via a peripheral bus, such as a Peripheral Component Interconnect bus (e.g., PCI, PCI Express). The touch sensors 1025 can include touch screen sensors, pressure sensors, or fingerprint sensors. The wireless transceiver 1026 can be a Wi-Fi transceiver, a Bluetooth transceiver, or a mobile network transceiver such as a 3G, 4G, or Long Term Evolution (LTE) transceiver. The firmware interface 1028 enables communication with system firmware, and can be, for example, a unified extensible firmware interface (UEFI). The network controller 1034 can enable a network connection to a wired network. In some embodiments, a high-performance network controller (not shown) couples with the interface bus 1010. The audio controller 1046, in one embodiment, is a multi-channel high definition audio controller. In one embodiment the system 1000 includes an optional legacy I/O controller 1040 for coupling legacy (e.g., Personal System 2 (PS/2)) devices to the system. The platform controller hub 1030 can also connect to one or more Universal Serial Bus (USB) controllers 1042 connect input devices, such as keyboard and mouse 1043 combinations, a camera 1044, or other USB input devices.

The following pertains to further examples.

Example 1 is an apparatus, comprising a computer readable memory; at least one of a signature logic to generate a signature to be transmitted in association with a message, the signature logic to apply a hash-based signature scheme to the message using a private key to generate the signature comprising a public key, or a verification logic to verify a signature received in association with the message, the verification logic to apply the hash-based signature scheme to verify the signature using the public key; and an accelerator logic to apply a structured order to at least one set of inputs to the hash-based signature scheme.

In Example 2, the subject matter of Example 1 can optionally include logic to divide the signature into a plurality of signature components; and apply a secure hash algorithm (SHA) to the plurality of signature components.

In Example 3, the subject matter of any one of Examples 1-2 can optionally include logic to identify a hash chain message length for each signature component in the plurality of signature components; and sort the plurality of signature components into an indexed hash chain list according to the respective hash chain message length of each signature component in the plurality of signature components.

In Example 4, the subject matter of any one of Examples 1-3 can optionally include an arrangement wherein the hash-based signature scheme utilizes a plurality of hash engines to apply the SHA to the plurality of signature components.

In Example 5, the subject matter of any one of Examples 1-4 can optionally include logic to assign the plurality of signature components into a plurality of groups according to their respective chain message lengths, the plurality groups corresponding to the plurality of hash engines; and assign the plurality of groups to the plurality of hash engines to be executed contemporaneously.

In Example 6, the subject matter of any one of Examples 1-5 can optionally include logic to alternate between the signature component having a longest chain message length and a signature component having a shortest chain message length to assign the plurality of signature components into the corresponding plurality of groups Example 8 is a computer-implemented method, comprising performing at least one of generating a signature to be transmitted in association with a message by applying a hash-based signature scheme to the message using a private key to generate the signature comprising a public key, or verifying a signature received in association with the message, the verification logic to apply the hash-based signature scheme to verify the signature using the public key; and applying a structured order to at least one set of inputs to the hash-based signature scheme.

In Example 9, the subject matter of Example 8 can optionally include dividing the signature into a plurality of signature components; and applying a secure hash algorithm (SHA) to the plurality of signature components.

In Example 10, the subject matter of any one of Examples 8-9 can optionally include identifying a hash chain message length for each signature component in the plurality of signature components; and sorting the plurality of signature components into an indexed hash chain list according to the respective hash chain message length of each signature component in the plurality of signature components.

In Example 11, the subject matter of any one of Examples 8-10 can optionally include an arrangement wherein the hash-based signature scheme utilizes a plurality of hash engines to apply the SHA to the plurality of signature components.

In Example 12, the subject matter of any one of Examples 8-11 can optionally include assigning the plurality of signature components into a plurality of groups according to their respective chain message lengths, the plurality groups corresponding to the plurality of hash engines; and assigning the plurality of groups to the plurality of hash engines to be executed contemporaneously.

In Example 13, the subject matter of any one of Examples 8-12 can optionally include alternating between the signature component having a longest chain message length and a signature component having a shortest chain message length to assign the plurality of signature components into the corresponding plurality of groups.

In Example 14, the subject matter of any one of Examples 8-13 can optionally include an arrangement wherein the hash-based signature scheme comprises an XMSS signature scheme.

Example 15 is a computer program product comprising logic instructions stored on a non-transitory computer readable medium which, when executed by a controller, configure the controller to perform operations comprising applying a hash-based signature scheme to perform at least one of: generating a signature using a private key, the signature to be transmitted in association with a message comprising a public key, or verifying the signature received in association with the message using the public key; and applying a structured order to at least one set of inputs to the hash-based signature scheme.

In Example 16, the subject matter of Example 15 can optionally include instructions to configure the processor to perform operations dividing the signature into a plurality of signature components; and applying a secure hash algorithm (SHA) to the plurality of signature components.

In Example 17, the subject matter of any one of Examples 15-16 can optionally instructions to configure the processor to perform operations include identifying a hash chain message length for each signature component in the plurality of signature components; and sorting the plurality of signature components into an indexed hash chain list according to the respective hash chain message length of each signature component in the plurality of signature components.

In Example 18, the subject matter of any one of Examples 15-17 can optionally include an arrangement wherein the hash-based signature scheme utilizes a plurality of hash engines to apply the SHA to the plurality of signature components.

In Example 19, the subject matter of any one of Examples 15-18 can optionally include instructions to configure the processor to perform operations assigning the plurality of signature components into a plurality of groups according to their respective chain message lengths, the plurality groups corresponding to the plurality of hash engines; and assigning the plurality of groups to the plurality of hash engines to be executed contemporaneously.

In Example 20, the subject matter of any one of Examples 15-19 can optionally include instructions to configure the processor to perform operations alternating between the signature component having a longest chain message length and a signature component having a shortest chain message length to assign the plurality of signature components into the corresponding plurality of groups.

In Example 21, the subject matter of any one of Examples 15-20 can optionally include an arrangement wherein the hash-based signature scheme comprises an XMSS signature scheme.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
processing circuitry to perform operations comprising at least one of:
generate a signature to be transmitted in association with a message, the processing circuitry to apply a hash-based signature scheme to the message using a private key to generate the signature comprising a public key, or
verify a signature received in association with the message, the processing circuitry to apply the hash-based signature scheme to verify the signature using the public key;
divide the signature into a plurality of signature components; and
apply a secure hash algorithm (SHA) to the plurality of signature components; and
an accelerator circuitry to:
apply a structured order to at least one set of inputs to the hash-based signature scheme;

identify a hash chain message length for each signature component in the plurality of signature components; and sort the plurality of signature components into an indexed hash chain list according to the respective hash chain message length of each signature component in the plurality of signature components.

2. The apparatus of claim 1, wherein the hash-based signature scheme utilizes a plurality of hash engines to apply the SHA to the plurality of signature components.

3. The apparatus of claim 2, the accelerator circuitry to:
assign the plurality of signature components into a plurality of groups according to their respective chain message lengths, the plurality groups corresponding to the plurality of hash engines; and
assign the plurality of groups to the plurality of hash engines to be executed contemporaneously.

4. The apparatus of claim 3, the accelerator circuitry to:
alternate between the signature component having a longest chain message length and a signature component having a shortest chain message length to assign the plurality of signature components into the corresponding plurality of groups.

5. The apparatus of claim 1, wherein the hash-based signature scheme comprises an XMSS signature scheme.

6. A computer-implemented method, comprising:
performing at least one of:
generating a signature to be transmitted in association with a message by applying a hash-based signature scheme to the message using a private key to generate the signature comprising a public key, or
verifying a signature received in association with the message by applying the hash-based signature scheme to verify the signature using the public key;
dividing the signature into a plurality of signature components; and
applying a secure hash algorithm (SHA) to the plurality of signature components; and
applying a structured order to at least one set of inputs to the hash-based signature scheme;
identifying a hash chain message length for each signature component in the plurality of signature components; and
sorting the plurality of signature components into an indexed hash chain list according to the respective hash chain message length of each signature component in the plurality of signature components.

7. The method of claim 6, wherein the hash-based signature scheme utilizes a plurality of hash engines to apply the SHA to the plurality of signature components.

8. The method of claim 7, further comprising:
assigning the plurality of signature components into a plurality of groups according to their respective chain message lengths, the plurality groups corresponding to the plurality of hash engines; and
assigning the plurality of groups to the plurality of hash engines to be executed contemporaneously.

9. The method of claim 8, further comprising:
alternating between the signature component having a longest chain message length and a signature component having a shortest chain message length to assign the plurality of signature components into the corresponding plurality of groups.

10. The method of claim 6, wherein the hash-based signature scheme comprises an XMSS signature scheme.

11. A non-transitory computer-readable medium comprising instructions which, when executed by a processor, configure the processor to perform operations, comprising:
performing at least one of:
generating a signature using a private key, the signature to be transmitted in association with a message comprising a public key, or
verifying the signature received in association with the message using the public key; and
applying a structured order to at least one set of inputs to the hash-based signature scheme;
dividing the signature into a plurality of signature components; and
applying a secure hash algorithm (SHA) to the plurality of signature components; and
applying a structured order to at least one set of inputs to the hash-based signature scheme;
identifying a hash chain message length for each signature component in the plurality of signature components; and
sorting the plurality of signature components into an indexed hash chain list according to the respective hash chain message length of each signature component in the plurality of signature components.

12. The non-transitory computer-readable medium of claim 11, wherein the hash-based signature scheme utilizes a plurality of hash engines to apply the SHA to the plurality of signature components.

13. The non-transitory computer-readable medium of claim 12, wherein the instructions configure the processor to perform operations comprising:
assigning the plurality of signature components into a plurality of groups according to their respective chain message lengths, the plurality groups corresponding to the plurality of hash engines; and
assigning the plurality of groups to the plurality of hash engines to be executed contemporaneously.

14. The non-transitory computer-readable medium of claim 13, wherein the instructions configure the processor to perform operations comprising:
alternating between the signature component having a longest chain message length and a signature component having a shortest chain message length to assign the plurality of signature components into the corresponding plurality of groups.

15. The non-transitory computer-readable medium of claim 11, wherein the hash-based signature scheme comprises an XMSS signature scheme.

* * * * *